(12) United States Patent
Agius et al.

(10) Patent No.: US 9,499,214 B2
(45) Date of Patent: Nov. 22, 2016

(54) MOTOR VEHICLE PLASTIC BODY PANEL

(71) Applicant: Ford Global Technologies, LLC, Dearborn, MI (US)

(72) Inventors: Alicia Agius, Romford (GB); Tom Overington, Brentwood (GB); Michael Brown, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/267,356

(22) Filed: May 1, 2014

(65) Prior Publication Data

US 2014/0327269 A1 Nov. 6, 2014

(30) Foreign Application Priority Data

May 1, 2013 (GB) .................................. 1307893.6

(51) Int. Cl.
| | |
|---|---|
| B62D 29/04 | (2006.01) |
| B29C 45/16 | (2006.01) |
| B60J 5/04 | (2006.01) |
| B29L 31/30 | (2006.01) |

(52) U.S. Cl.
CPC ............. *B62D 29/043* (2013.01); *B29C 45/16* (2013.01); *B29C 45/164* (2013.01); *B29C 45/1671* (2013.01); *B29K 2995/0025* (2013.01); *B29K 2995/0026* (2013.01); *B29L 2031/3005* (2013.01); *B29L 2031/3052* (2013.01); *B60J 5/0481* (2013.01)

(58) Field of Classification Search
CPC ............. B62D 29/043; B29C 45/164; B29C 45/1671; B29C 46/16; B60J 5/0481; B29K 2995/0025; B29K 2995/0026; B29L 2031/3052; B29L 2031/3005
USPC .................................................. 296/201, 191
See application file for complete search history.

(56) References Cited

U.S. PATENT DOCUMENTS

| | | | |
|---|---|---|---|
| 6,378,931 B1 * | 4/2002 | Kolluri et al. | ........... 296/146.15 |
| 7,828,365 B2 * | 11/2010 | Kiriakou et al. | .......... 296/146.1 |
| 8,169,684 B2 | 5/2012 | Bugno et al. | |
| 2008/0155902 A1 | 7/2008 | Kaiser | |
| 2011/0254311 A1 * | 10/2011 | Dajek et al. | ................ 296/146.6 |
| 2012/0235436 A1 | 9/2012 | Sun | |
| 2014/0314901 A1 * | 10/2014 | Takaoka | ........................ 425/577 |

FOREIGN PATENT DOCUMENTS

| | | |
|---|---|---|
| JP | 2008006918 A | 1/2008 |
| JP | 2011224992 A | 11/2011 |
| JP | 2013141770 A * | 7/2013 |

* cited by examiner

*Primary Examiner* — Glenn Dayoan
*Assistant Examiner* — Melissa A Black
(74) *Attorney, Agent, or Firm* — Jason C. Rogers; Price Heneveld LLP

(57) ABSTRACT

A motor vehicle plastic body panel is disclosed having an opaque plastic panel and a plastic window pane formed as an integral part of the plastic body panel by co-molding it with the opaque plastic panel. A lightweight motor vehicle body panel made completely from plastic is therefore provided. The plastic body panel requires no window seals due to the integration of the plastic window pane as part of the plastic body panel.

20 Claims, 1 Drawing Sheet

MOTOR VEHICLE PLASTIC BODY PANEL

BACKGROUND OF THE INVENTION

This invention relates to motor vehicles and in particular to a motor vehicle plastic body panel.

It is known to use a plastic body panel for a motor vehicle having a glass window pane fitted in a frame and provided with a seal between the window pane and the body panel to prevent water ingress. Such an arrangement has the disadvantage that the weight of the glass is considerable and so the weight of the assembled glass window pane and plastic body panel is higher than is desirable. In addition, it is both time consuming and expensive to provide a seal between the plastic body panel and the glass window pane and such seals are prone to deterioration with consequent risk of leakage.

There is an increasing need to reduce the weight of a motor vehicle as this will result in reduced fuel consumption.

Therefore the use of plastic for the fixed windows of a motor vehicle is desirable and advantageous as it offers the prospect of a considerable weight saving.

SUMMARY OF THE INVENTION

It is an object of the invention to provide a plastic motor vehicle body panel having a plastic window.

According to a first aspect of the invention there is provided a motor vehicle plastic body panel comprising a plastic window pane and an opaque plastic panel defining an outer surface of part of the motor vehicle wherein the plastic window pane is moulded as an integral part of the motor vehicle plastic body panel.

This has the advantage that no seals are required between the plastic window pane and the opaque plastic panel thereby reducing assembly costs and eliminating the possibility of water leaks.

The plastic window pane and the opaque plastic panel may be formed by one of a co-moulding process and an over moulding process.

The plastic window pane may have an outer peripheral border and the outer peripheral border of the plastic window pane may be embedded within the opaque plastic panel.

The opaque plastic panel may have an aperture defining a window frame and an inner peripheral edge of the outer peripheral border of the plastic window pane may be defined by the window frame.

According to another aspect of the invention there is provided a motor vehicle having at least one plastic body panel constructed in accordance with said first aspect of the invention.

According to yet another aspect of the invention there is provided a method of manufacturing a one piece motor vehicle plastic body panel having a plastic window pane and an opaque plastic panel having an outer surface defining in use part of an exterior surface of a motor vehicle wherein the method comprises forming the plastic window pane from a first plastic material and injecting a second plastic material into a mould in which the plastic window pane is located so as to embed an outer peripheral border of the window pane in the second plastic material and form the opaque plastic panel.

Forming the plastic window pane may comprise injecting the first plastic material into the mould to produce the plastic window pane before injecting the second plastic material into the mould to form the opaque plastic panel.

Alternatively, forming the plastic window pane may comprise producing a plastic window pane to a required size and shape from the first plastic material and placing the plastic window pane in the mould before injecting the second plastic material into the mould to form the opaque plastic panel.

The opaque plastic panel has a window frame portion in which the outer peripheral border of the plastic window pane is embedded.

BRIEF DESCRIPTION OF THE DRAWINGS

The invention will now be described by way of example with reference to the accompanying drawing of which.

DESCRIPTION OF THE EMBODIMENTS

Figure 1:
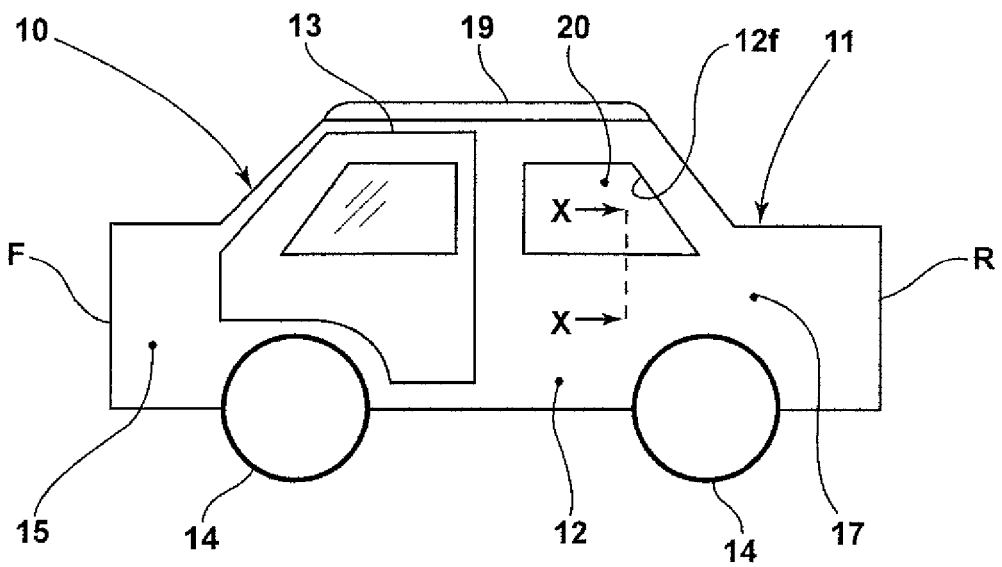
FIG. 1 is a schematic side view of a motor vehicle according to a second aspect of the invention having a pair of plastic body panels according to a first aspect of the invention.
Figure 2:
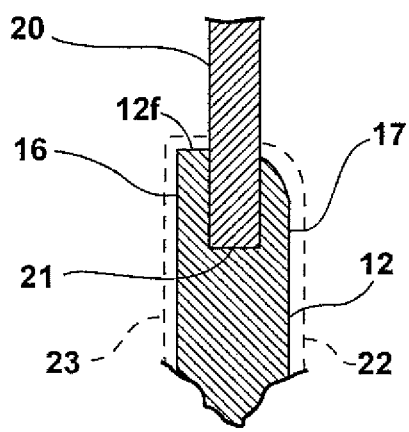
FIG. 2 is a cross-section along the line X-X on FIG. 1.

With reference to FIG. 1 there is shown a motor vehicle 10 having a body structure including two rear plastic body panels 11 of which only the left-hand side one is visible. The motor vehicle 10 has a front end 'F' and a rear end 'R' and four road wheels 14 at least two of which are driven by a drivetrain of the motor vehicle 10. The motor vehicle 10 includes a pair of front doors 13 of which only the left-hand side one is visible and various other external body panels such as a trunk lid, a bonnet, a pair of front wings 15 of which only the left-hand side one is visible and a roof 19 all of which may be made from plastic.

Each of the rear plastic body panels 11 comprises an opaque plastic panel portion 12 having an aperture defining a window frame 12f and a fixed, immoveable plastic window pane 20 formed as an integral part of the rear body panel 11.

The opaque plastic panel 12 has an inner surface 16 and an outer surface 17, the outer surface 17 defining part of an outer surface of the motor vehicle.

The plastic window pane 20 has an outer periphery 21 that is embedded in the opaque plastic panel 12 such that an outer peripheral border of the plastic window pane 20 lies within the opaque plastic panel 12. The outer peripheral border of the plastic window pane 20 corresponds to the part of the plastic window pane 20 that is embedded in the opaque plastic panel 12 and an inner peripheral edge of the outer peripheral border of the plastic window pane 20 is defined by the window frame 12f.

The plastic window pane 20 can be made from any suitable transparent plastic having good optical clarity and scratch resistance. One such plastic material is polycarbonate but the invention is not limited to the use of polycarbonate. Although the plastic window pane 20 is transparent it is not necessarily clear, it could be tinted depending upon it location.

The opaque plastic panel 12 is moulded over the plastic window pane 20 so that no seal is needed therebetween. Various materials could be used for the opaque plastic panel including but not limited to ABS, a reinforced plastic such as fibre reinforced polypropylene and other injection mouldable plastics having sufficient thermal stability and strength for use as a motor vehicle body panel.

The rear body panel 11 can be manufactured by several methods, in a first method, a two shot co-moulding process is used. In this process a first plastic material is injected into a first cavity in a mould to form the plastic window pane 20 and then a second plastic material is injected into a second cavity in the mould. The second plastic material flows around the outer peripheral border of the window pane 20 so as to embed it therein and also flows in the mould cavity to produce the required inner and outer surfaces 16 and 17 of the opaque plastic panel 12.

It will be appreciated that the two plastic materials could be the same basic plastic but having different properties the most significant difference being that one is transparent and the other is not.

Although the process described above is a twin shot co-moulding process it will be appreciated that it could include more than two shots if more than two materials are used. For example, an exterior trim member 22 could also be formed as an integral part of the rear body panel 11 around the window pane 20 and/or a soft touch interior trim 23 could be formed on part of the inner surface 16 of the rear plastic body panel 11. In such cases three or four shot injection moulding processes would be required. US Patent Application 2012/0235436 discloses a method for producing a decorative trim bezel and the techniques disclosed in US Patent Application 2012/0235436 could be applied to produce a decorative trim around the window pane 20.

Advantages of the use of a co-moulding process include faster cycle time due to not having to transfer the part to another tool and the reduction of handling errors in between shots.

In an alternative method, the window pane is manufactured to a desired shape and size by a first process, which could be an injection moulding process. The sized and shaped plastic window pane is then placed in a mould into which a plastic material is injected to form the opaque plastic panel 12. As before the mould is shaped to form the inner and outer surfaces 16 and 17 of the opaque body panel 12. Such a process is sometimes referred to as 'over moulding' or 'insert moulding'.

One advantage of the invention is that a one piece plastic body panel is formed in an economical manner. A further advantage is that no seals are required between the plastic window pane and the opaque plastic panel because the two components are moulded together.

Although the invention has been described with reference to an example in which the plastic body panel is a rear body panel it will be appreciated that it is not limited to such use. Other potential applications include, for example and without limitation, tailgates, front and rear windscreens, fixed sunroofs and/or panoramic roofs.

Some advantages of the invention are that it results in a lightweight body panel construction due to the use of plastic for entire body panel, a reduced number of components and reduced cost (e.g. clips and secondary trim panels may not be required) and the single piece plastic exterior panel and window results in a reduction of the number of parts to be assembled and hence a reduction in assembly time.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. A plastic body panel for a motor vehicle comprising:
    a generally transparent window pane formed from a first pre-selected plastic in a first shot of a two-shot injection moulding process; and
    an opaque panel defining an outer surface of a part of the motor vehicle and formed from a second pre-selected plastic in a second shot of the two-shot injection moulding process, wherein the window pane has an outer peripheral border that is integrally embedded into the opaque panel during the second shot of the two-shot injection moulding process and two opposing sides of the opaque panel are each visible on the vehicle.

2. The plastic body panel of claim 1, wherein the window pane and the opaque panel are formed by one of a co-moulding process and an over moulding process.

3. The plastic body panel of claim 1, wherein the entire peripheral border of the window pane is integrally embedded into the opaque panel.

4. The plastic body panel of claim 3, wherein the opaque panel has an aperture defining a window frame and an inner peripheral edge of the outer peripheral border of the window pane is defined by the window frame.

5. The plastic body panel of claim 1, wherein the window pane is formed from a polycarbonate material.

6. The plastic body panel of claim 1, wherein the opaque panel is formed from a material at least partially composed of acrylonitrile butadiene styrene.

7. The plastic body panel of claim 1, wherein the opaque panel is formed from material at least partially composed of a fiber reinforced polypropylene.

8. A method of manufacturing a one piece motor vehicle plastic body panel having a plastic window pane and an opaque plastic panel having an outer surface defining in use part of an exterior surface of a motor vehicle wherein the method comprising:
    forming the plastic window pane from a first plastic material during a first shot of a two-shot injection moulding process; and
    injecting a second plastic material into a mould in which the plastic window pane is located during a second shot of the two-shot injection moulding process so as to embed an outer peripheral border of the window pane in the second plastic material to form the opaque plastic panel, wherein the plastic window pane is solely supported by the embedding of the outer peripheral border.

9. The method of claim 8, wherein forming the plastic window pane comprises:
    injecting the first plastic material into the mould to produce the plastic window pane before injecting the second plastic material into the mould to form the opaque plastic panel.

10. The method of claim 8, wherein forming the plastic window pane comprises:
    producing a plastic window pane to a required size and shape from the first plastic material; and
    placing the plastic window pane in the mould before injecting the second plastic material into the mould to form the opaque plastic panel.

11. The method of claim 8, wherein integrally forming the second plastic material integrally forms both a side panel of a vehicle and a rear fender of the vehicle.

12. The method of claim 8, further comprising:
    monolithically forming the opaque plastic panel and the plastic window pane from a single piece of material during an injection moulding process.

13. The method of claim 8, further comprising:
    forming the plastic window pane and the window frame portion utilizing a twin shot co-moulding process with the injection moulding process.

14. The method of claim 12, further comprising:
forming the plastic window pane and the window frame portion utilizing an insert moulding process.

15. The method of claim 12, further comprising:
forming the plastic window pane and the window frame portion utilizing a two-shot injection moulding process.

16. The method of claim 8, further comprising:
forming the plastic window pane from a polycarbonate material.

17. The method of claim 8, further comprising:
forming the opaque plastic panel from a material at least partially composed of acrylonitrile butadiene styrene.

18. The method of claim 8, further comprising:
forming the opaque plastic panel from a material at least partially composed of a fiber reinforced polypropylene.

19. A body panel for a motor vehicle comprising:
an opaque panel formed from a first, fibre reinforced plastic material and shaped as a vehicle body panel, the opaque panel defining a window opening;
an exterior trim panel integrally disposed on a first side of the opaque panel and an interior trim panel integrally disposed on a second, opposing side of the opaque panel; and
an at least partially transparent window pane formed from a second plastic material and disposed in a channel defined in the opaque panel wherein an entire periphery of the window pane is integrally embedded within the channel during an injection moulding process.

20. The plastic body panel for a motor vehicle of claim 1, wherein the first plastic material contains a tint material therein for altering the transparency of the window pane.

\* \* \* \* \*